United States Patent [19]

Taylor et al.

[11] Patent Number: 4,776,910
[45] Date of Patent: Oct. 11, 1988

[54] OPTICAL CABLE MANUFACTURE

[75] Inventors: John E. Taylor, Maidenhead; Jonathan E. Nevett, London, both of England

[73] Assignee: BICC Public Limited Company, London, England

[21] Appl. No.: 61,897

[22] Filed: Jun. 12, 1987

[30] Foreign Application Priority Data

Jun. 17, 1986 [GB] United Kingdom ............ 8614767

[51] Int. Cl.$^4$ .................. B65H 81/00; G02B 6/44
[52] U.S. Cl. .................... 156/145; 156/173; 156/201; 350/96.23
[58] Field of Search ............ 156/48, 53, 55, 56, 156/145, 149, 173, 175, 187, 201, 204, 215, 171, 195, 177, 296; 350/96.23

[56] References Cited

U.S. PATENT DOCUMENTS

| 3,687,782 | 8/1972 | Comte .................. 156/55 X |
| 4,090,902 | 5/1978 | Ferrentino et al. ............. 156/177 |
| 4,146,302 | 3/1979 | Jachimowicz ............ 156/173 X |
| 4,202,718 | 5/1980 | Mizutani et al. ............. 156/171 |
| 4,370,023 | 1/1983 | Lange et al. ............. 350/96.23 |
| 4,508,423 | 4/1985 | Winter .................. 350/96.23 |
| 4,690,498 | 9/1987 | Priaroggia ............. 350/96.23 |

FOREIGN PATENT DOCUMENTS

| 0105561 | 8/1979 | Japan .................. 350/96.23 |
| 2144237 | 2/1985 | United Kingdom ......... 350/96.23 |
| 2168730 | 6/1986 | United Kingdom ......... 350/96.23 |

Primary Examiner—Michael W. Ball
Assistant Examiner—Geoffrey L. Knable
Attorney, Agent, or Firm—Anthony J. Casella; Gerald E. Hespos

[57] ABSTRACT

An optical cable having a bore in which is loosely housed two helically extending optical fibre ribbons and which is filled with a greasy water-impermeable medium is manufactured by feeding four flexible cords of electrically insulating material into circumferentially spaced, longitudinally extending grooves in the outer surface of a stationary rigid tubular elongate guide of circular cross-section, helically lapping two optical fibre ribbons around the guide and the flexible cords so that the cords support the helically lapped ribbons, applying longitudinally to and transversely folding around the guide and the optical fibre ribbon a flexible strip of electrically insulating material to form a tube, introducing water-impermeable medium in a liquid or semi-liquid state through a bore in the guide and into the tube and extruding around the tube a sheath of electrically insulating material. Preferably, at a position downstream of the position at which water-impermeable medium is introduced into the tube, the flexible cords are fed through a die downstream of and in axial alignment with the guide so that the cords will lie along the center of the filled tube and will not inhibit movement of the helically lapped optical fibre ribbons when the cable is flexed or stretched.

10 Claims, 2 Drawing Sheets

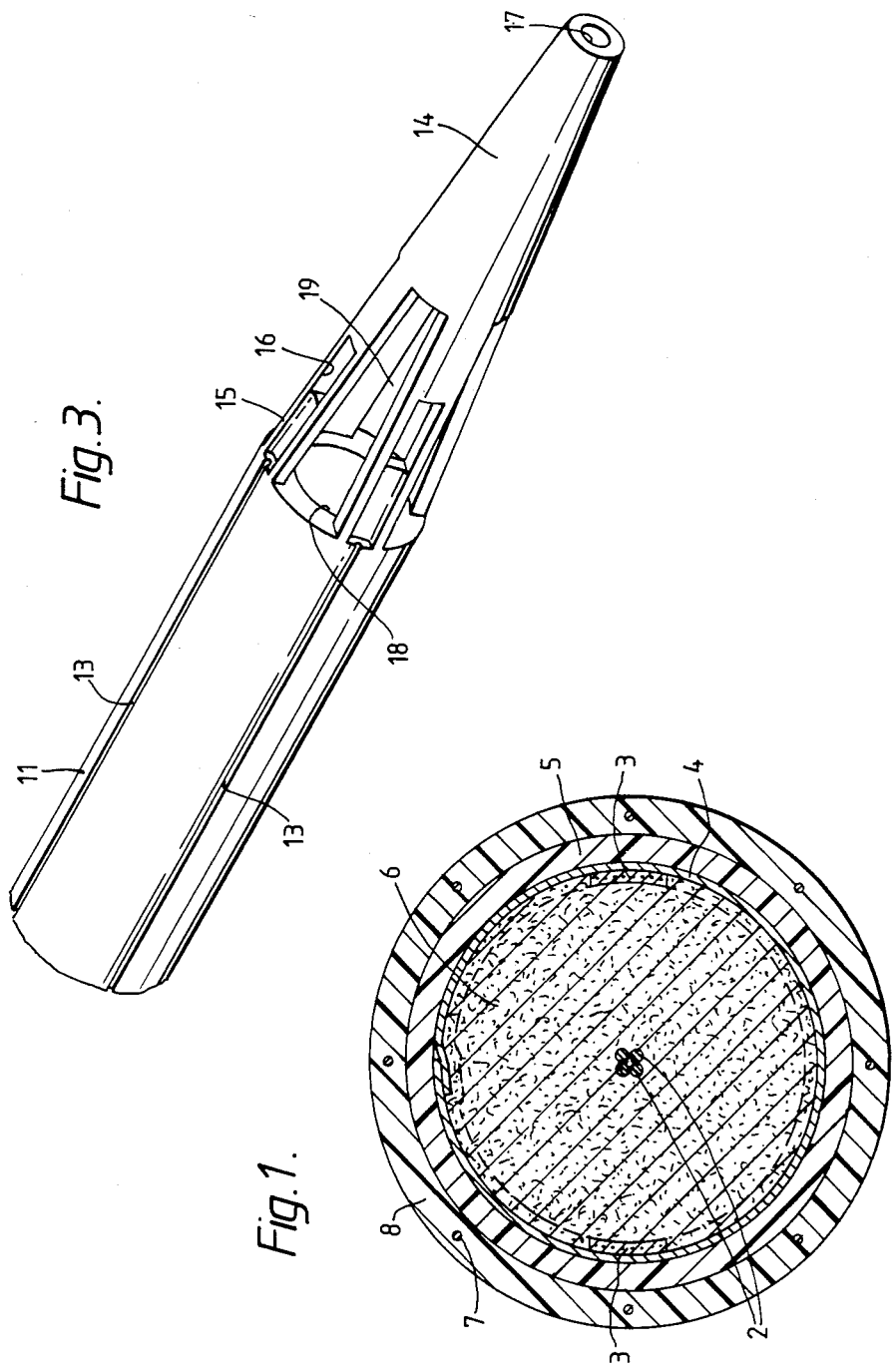

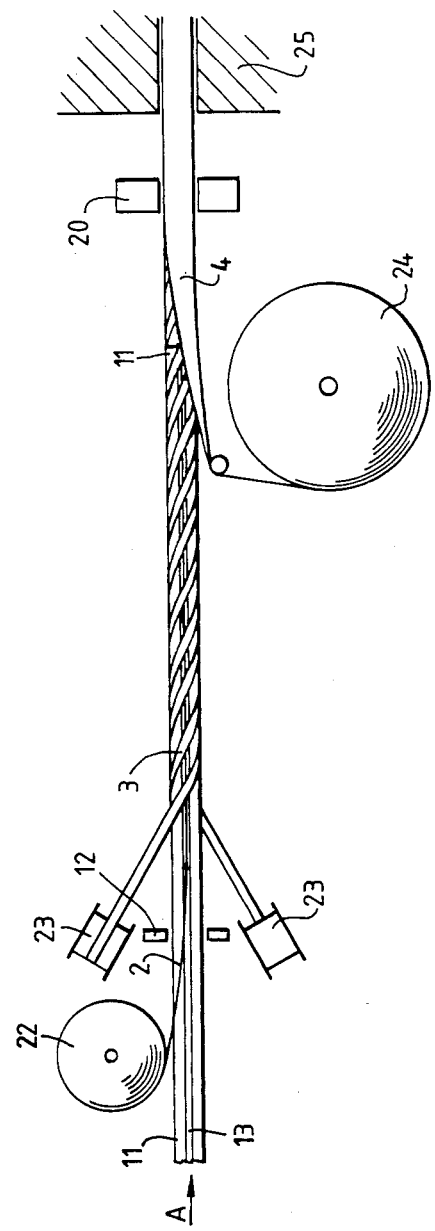

OPTICAL CABLE MANUFACTURE

This invention relates to optical cables and is particularly concerned with optical cables of the kind wherein at least one optical fibre ribbon, as hereinafter defined, follows a helical path around the longitudinal axis of and is loosely housed in a bore in the cable and wherein the bore is substantially filled throughout its length with a greasy water-impermeable medium of such a consistency as to permit movement of the ribbon within the filled bore.

By an optical fibre ribbon is meant a plurality of optical fibres arranged side-by-side and embedded in or supported on a flexible elongate body of electrically insulating material; the optical fibre ribbon may include one or more than one elongate reinforcing element extending alongside or between the optical fibres.

It is an object of the present invention to provide an improved method of manufacturing an optical cable of the aforesaid kind, which method is simple to effect and requires no expensive specialized plant.

According to the invention, the improved method comprises continuously feeding at least one flexible elongate element in the direction of its length on to the outer surface of a stationary substantially rigid elongate guide member of substantially circular transverse cross-section and of limited length; helically lapping at least one optical fibre ribbon as hereinbefore described around the stationary guide member and the flexible elongate element or elements advancing along the member so that the flexible elongate element or elements support or supports the helically lapped optical fibre ribbon or ribbons; applying longitudinally to and transversely folding around the guide member and the optical fibre ribbon or ribbons helically lapped therearound at least one flexible strip of electrically insulating material to form a tube; introducing a greasy water-impermeable medium in a liquid or semi-liquid state through a bore in the guide member and into the advancing tube; and, at a position downstream of the guide member, extruding or otherwise forming around the tube a circumferentially continuous sheath of electrically insulating material to form a plastics sheathed optical cable having a bore filled throughout its length with a greasy water-impermeable medium of such a consistency as to permit movement of the or each optical fibre ribbon within the filled bore when the cable is flexed or stretched.

The or each flexible elongate element serves as a support for the helically lapped optical fibre ribbon or ribbons to maintain the ribbon or ribbons against the internal surface of the tube whilst water-impermeable medium in a liquid or semi-liquid state is being introduced into the tube. After the tube has been substantially filled with water-impermeable medium, the or each flexible elongate element becomes redundant because it serves no useful purpose in the cable whilst the cable is being installed or is in service. Preferably, therefore, at a position downstream of the position at which water-impermeable medium is introduced into the tube, the or each flexible elongate element is fed through a die downstream of and in axial alignment with the stationary guide member so that the flexible element or elements will lie along the centre of the filled tube and, thereby, will not inhibit radially inward movement of the or a helically lapped optical fibre ribbon when the optical cable is flexed or stretched.

Preferably, where two or more flexible elongate elements are fed in the direction of their lengths on to the outer surface of the stationary member, each flexible elongate element is a cord or strand of electrically insulating material which is fed into a groove extending lengthwise in the outer surface of the guide member; alternatively, each of two or more flexible elongate elements may be a tape of electrically insulating material, e.g. paper or plastics material, which overlies an arcuate portion of the outer surface of the stationary guide member, which arcuate portion is circumferentially spaced from the arcuate portion of the outer surface that the or each other tape overlies. Where a single flexible elongate element is fed in the direction of its length on to the outer surface of the guide member, preferably the flexible elongate element is a perforated tape of electrically insulating material, e.g. paper or plastics material, which is applied longitudinally to and transversely folded around the guide member. In all cases, preferably the or each flexible elongate element extends substantially parallel to the longitudinal axis of the guide member.

In a preferred embodiment, two optical fibre ribbons are helically lapped around the guide member and the flexible elongate element or elements extending along the member.

Any suitable greasy water-impermeable medium may be employed to fill the tube of the optical cable but a greasy water-impermeable medium having thixotropic properties is preferred. One such greasy water-impermeable medium that may be employed comprises a liquid silicone rubber comprising a suspension of colloidal silica in a silicone oil, the proportion of colloidal silica to silicone oil lying in the range 1:3 to 1:10 parts by weight. The addition of colloidal silica to the silicone oil imparts thixotropic qualities to the liquid silicone rubber.

Preferably, the proportion of colloidal silica to silicone oil in the liquid silcone rubber is 1:3.5 parts by weight. Preferably, also, the preferred liquid silicone rubber is prepared by adding to two parts by weight of the liquid silicone rubber sold by Dow Corning under the trade name Liquid Silicone Rubber 9595A an additional one part by weight silicone oil sold by Dow Corning under the trade name Silcone Fluid 200/1000cs.

In addition to substantially filling the tube, the greasy water-impermeable medium serves as a lubricant between the optical fibre ribbon or ribbons and the tube wall and, where two or more optical fibre ribbons are present, between the optical fibre ribbons themselves.

At least one layer of circumferentially spaced non-metallic reinforcing elements may be applied around the circumferentially continuous sheath of electrically insulating material and an outer circumferentially continuous sheath of electrically insulating material may be extruded or otherwise formed overall so that the circumferentially spaced reinforcing elements are encapsulated therein.

The non-metallic reinforcing elements are preferbly made of aromatic polyamide sold under the trade name "Kevlar".

The or each circumferentially continuous sheath of electrically insulating material may be made of any suitable plastics material, polyethylene being preferred.

The invention also includes an optical cable made by the improved method hereinbefore described.

The invention is further illustrated by a description, by way of example, of the preferred method of manufacturing an optical cable with reference to the accompanying drawings, in which the following is a brief description of the drawings:

FIG. 1 is a diagrammatic transverse cross-sectional view, not to scale of the optical cable;

FIG. 2 is a diagrammatic side view of the apparatus employed in the preferred method of manufacturing the optical cable shown in FIG. 1; and FIG. 3 is a fragmental pictorial view, drawn on a greatly enlarged scale, of the downstream end of a stationary rigid elongate tubular guide member of the apparatus shown diagrammatically in FIG. 2, with all components of the optical cable under manufacture omitted.

Referring to FIG. 1, the optical cable comprises a circumferentially continuous sheath 5 of polyethylene whose internal surface is bounded by a longitudinally extending, transversely folded strip 4 of electrically insulating material. Positioned immediately adjacent the inner surface of the strip 4 are two optical fibre ribbons 3, each of which follows a helical path around the longitudinal axis of and is loosely housed in the bore of the circumferentially continuous sheath 5. The bore of the circumferentially continuous sheath 5 is filled throughout its length with a greasy water-impermeable medium 6 of such a consistency as to permit movement of each optical fibre ribbon 3 within the filled bore and, lying along the centre of the filled bore, are four flexible cords 2 of an aromatic polyamide which have been employed in the manufacture of the cable and which, because they are so positioned in the bore of the sheath, will not inhibit radially inward movement of each optical fiber ribbon 3 when the optical cable is flexed or stretched. Surrounding the circumferentially continuous sheath 5 is an overall circumferentially continuous sheath 8 of polyethylene in which are encapsulated a plurality of circumferentially spaced, helically extending reinforcing elements 7 of an aromatic polyamide.

As will be seen on referring to FIGS. 2 and 3, in the preferred method of manufacturing the optical cable shown in FIG. 1, four cords 2 of an aromatic polyamide are fed from supply reels 22 (of which one only is shown) through a die 12 into four circumferentially spaced, longitudinally extending grooves 13 in the outer surface of a stationary rigid elongate tubular guide member 11 of circular cross-section, the grooves being of such a depth having regard to the diameters of the cords that each cord protrudes beyond the circumferential outer surface of the guide member. Two optical fibre ribbons 3 from supply reels 23 are helically lapped around the tubular guide member 11 and cords 2 extending along the grooves 13 in the member so that the cords support the helically lapped ribbons and a flexible strip 4 of electrically insulating plastics material from a supply pad 24 is applied longitudinally to and transversely folded by a die 20 around the helically lapped optical fibre ribbons to form a tube. Immediately upstream of the die 20, the tubular guide member 11 is terminated by a tubular nose portion 14 (FIG. 3) which is of a frusto-conical shape having a maximum external diameter at its upstream end substantially less than the external diameter of the tubular guide member and which is integral with the tubular guide member via four circumferentially spaced, longitudinally extending ribs 15, each of which has a longitudinally extending groove in its outer surface in substantial alignment with one of the grooves 13 in the outer surface of the tubular guide member. Each rib 15 has between its ends a slot 16 through which the cord being drawn along the associated groove 13 passes into the bore 17 of the tubular nose portion 14 so that the four cords no longer support the helically lapped optical fibre ribbons 3 but are assembled together to lie along the centre of the tube formed by the transversely folded strip 4. Water-impermeable medium 6 in a liquid or semi-liquid state is pumped in the direction of Arrow A into the bore 18 of the tubular guide member 11 at its upstream end and flows through the spaces 19 between the ribs 15 and around the tubular nose portion 14 to fill the tube as it is formed at the die 20. A circumferentially continuous sheath 5 of electrically insulating polyethylene is extruded around the tube formed by the transversely folded flexible strip 4 by an extruder 25 to form a plastics sheathed optical cable having a bore filled throughout its length with a greasy water-impermeable medium which will be of such a consistency as to permit movement of each optical fibre ribbon 3 within the bore when the cable is flexed or stretched.

In a separate operation, a plurality of circumferentially spaced reinforcing elements 7 of aromatic polyamide are helically applied around the plastics sheathed optical cable formed using the apparatus shown in FIGS. 2 and 3 as the cable enters an extruder which extrudes around the cable an overall circumferentially continuous sheath 8 of electrically insulating polyethylene having a circumferentially spaced, helically extending reinforcing elements encapsulated therein.

What we claim as our invention is:

1. A method of manufacturing an optical cable comprising at least one optical fibre which follows a helical path around the longitudinal axis of and is loosely housed in a bore in the cable, the bore being substantially filled throughout its length with a greasy water-impermeable medium of such a consistency as to permit movement of the ribbon within the filled bore, which method comprises continually feeding at least one flexible elongate element in the direction of its length on to the outer surface of a stationary substantially rigid elongate guide member of substantially circular transverse cross-section and of limited length; helically lapping at least one optical fibre ribbon around the stationary guide member and the flexible elongate element advancing along the member so that the flexible elongate element supports the helically lapped optical fibre ribbon; applying longitudinally to and transversely folding around the guide member and the optical fibre ribbon helically lapped therearound at least one flexible strip of electrically insulating material to form a tube; introducing a greasy water-impermeable medium in a liquid or semi liquid state through a bore in the guide member and into the advancing tube; at a position downstream of the position at which water-impermeable medium is introduced into the tube, feeding the flexible elongate element through a die downstream of and in axial alignment with the stationary guide member so that the flexible elongate member will lie along the centre of the filled tube; and, downstream of said die, extruding around the advancing tube a circumferentially continuous sheath of eletrically insulating material to form a plastics sheathed optical cable having a bore filled throughout its length with a greasy water-impermeable medium of such a consistency as to permit movement at the optical fibre ribbon within the filled bore when the cable is flexed or stretched.

2. A method as claimed in claim 1 in which at least two flexible elongate elements are fed in the direction of their lengths on to the outer surface of the stationary guide member, wherein each flexible elongate element is a cord of electrically insulating material which is fed into a groove extending lengthwise in the outer surface of the guide member and, downstream of the guide member, is fed through said die.

3. A method as claimed in claim 1 in which at least two flexible elongate elements are fed in the direction of their lengths onto the outer surface of the stationary guide member, wherein each flexible elongate element is a tape of electrically insulating material which overlies an arcuate portion of the outer surface of the guide member, said arcuate portion being circumferentially spaced from the arcuate portion of the outer surface that the or each other tape overlies, and which, downstream of the guide member, is fed through said die.

4. A method as claimed in claim 1 in which a single flexible elongate element is fed in the direction of its length on to the outer surface of the stationary guide member, wherein the flexible elongate element is a perforated tape of electrically insulating material which is applied longitudinally to and transversely folded around the guide member.

5. A method as claimed in claim 1, wherein the flexible elongate element extends substantially parallel to the longitudinal axis of the guide member.

6. A method as claimed in claim 1, wherein two optical fibre ribbons are helically lapped around the guide member and the flexible elongate element extending along the guide member.

7. A method as claimed in claim 1, wherein the greasy water-impermeable medium has thixotropic qualities.

8. A method as claimed in claim 7, wherein the greasy water-impermeable medium comprises a liquid silicone rubber comprising a suspension of coloidal silica in a silicone oil, the proportion of coloidal silica to silicone oil lying in the range 1:3 to 1:10 parts by weight.

9. A method as claimed in claim 1, wherein at least one layer of circumferentially spaced non-metallic reinforcing elements is applied around the circumferentially continuous sheath of electrically insulating material and an outer circumferentially continuous sheath of electrically insulating material is extruded overall so that the circumferentially spaced reinforcing elements are encapsulated therein.

10. A method as claimed in claim 1, wherein the circumferentially continuous sheath of electrically insulating material is made of polyethylene

* * * * *